United States Patent [19]

Rias

[11] 3,731,452
[45] May 8, 1973

[54] PROCESS AND APPARATUS FOR CONTINUOUS PACKAGING OF PRODUCTS AND OBJECTS

[75] Inventor: Jean Claude Rias, Maisons, France

[73] Assignee: Cogar Corporation, Wappinger Falls, N.Y.

[22] Filed: Jan. 12, 1971

[21] Appl. No.: 105,931

[30] Foreign Application Priority Data

Jan. 12, 1970 France..................................7000974

[52] U.S. Cl. ...............................53/29, 53/45, 53/66, 53/74, 53/183, 53/187
[51] Int. Cl............................B65b 9/14, B65b 57/12
[58] Field of Search.....................53/29, 30, 45, 183, 53/256, 06, 74, 187

[56] References Cited

UNITED STATES PATENTS

| | | | |
|---|---|---|---|
| 3,543,470 | 12/1970 | Trihey | 53/30 |
| 3,557,526 | 1/1971 | Hartmann | 53/183 |
| 3,308,601 | 3/1967 | Masters | 53/256 |
| 3,579,948 | 5/1971 | Lerner | 53/29 |
| 3,676,980 | 7/1972 | Engelhardt et al. | 53/183 |

Primary Examiner—Robert C. Riordon
Assistant Examiner—E. F. Desmond
Attorney—Robert E. Burns et al.

[57] ABSTRACT

A method and machine is disclosed for the continuous packaging of products, particularly in a six-sided parallelepipedal package, employing a heat-weldable and heat-shrinkable plastic material in special tubular sheath form, which involves continuously feeding of the sheath, transversely welding the same and feeding the sheath in flat condition a specified distance. Principal sections of the apparatus apply vacuum to the upper and lower surfaces of the flat sheath to open the sheath in a specified manner for the reception of the products to be packaged, after which the open end of the tubular sheath is closed and welded by special means to complete the package which is then moved out of the machine for shrinkage heating.

8 Claims, 9 Drawing Figures

PROCESS AND APPARATUS FOR CONTINUOUS PACKAGING OF PRODUCTS AND OBJECTS

The invention relates to a process and to a machine for the continuous manipulation of products or objects into a package, in particular into a six-sided parallelepipedal package, made of plastic material which is weldable and shrinkable by heat.

The existing techniques for the storage and conveying of products or objects, either in bulk, or simply piled on each other in such manner as to form a whole of substantially parallelepipedal general shape, require a handling operation on these products or objects, employing a casing of heat-shrinkable plastic material unreeled either in sheet form or in the form of a sheath before being conveyed towards the products to be packaged.

A machine is thus known, for wrapping four sides of parallelepipedal packages; to this end, the initial material consists of a weldable and shrinkable film in sheet form, the said sheet being placed on a horizontal or vertical carrier of a machine, facing towards a cavity which — in the idle state — is closed off by at least one disappearing panel. The item to be packaged is pushed, or drops simply by gravity, into the cavity, after the panel or panels has or have been withdrawn. Owing to this fact, the sheet of plastic material already enflanks three sides of the item to be packaged and it is sufficient to fold over the sheet on to the fourth side in extension of the three preceding sides, from either part of this fourth side, and then to weld the overlapping surfaces of the sheet substantially following the median axis of this fourth side to complete the package. As a rule, two parallel welds produced at a distance of a few millimeters from each other are made at the same time; it is thus possible to thread a cutting element between the two parallel welds and, owing to this fact, the item packaged may be freed and the sheet may be reconverted for subsequent packaging (British Pat. application No. 39104/64).

Machines are equally known for covering goods to be packaged, which ensure the retention of the load on a pallet. In such machines, the items to be covered are placed on the pallet, itself positioned on a mobile bearer, and are fed into a vertical structure. The wrapping, unreeled in the form of a sheath, is fed in by means of conveyor belts equipped with a multiplicity of suction or negative pressure element, over the load to be packaged, in such manner as to cap the latter. The sheath is then lowered to the level of the pallet in such manner as to produce a complete enwrapment of the item over its four vertical sides, after which a welding operation is performed at the height of the upper horizontal side in such manner as to close this package. As in the case of the machine for four-side wrapping described previously, the item which still remains secured on its supporting pallet, is conveyed to a stove in which the operation for shrinking the film of plastic material is to be performed; in the case of the load arranged on a pallet, the sheet shrinks over the whole made up of the items to be packaged and the pallet, and it holds the whole in a condition which allows of its being conveyed (German Pat. application Nos. P 17 61 895.0 ,P 19 23 672.7, and P 18 14 742.7). The disadvantages of this method of packaging on pallets, are the following:

The wrapping is produced on no more than five sides of the item to be packaged.

The height of the item to be packaged is limited; as a matter of fact, the heat-shrinkable sheath cannot be employed to encircle vertical panels of a thickness of a few millimeters since the wrapped package, which will retain the same vertical position throughout the following operations, will lack stability.

The delivered length of the sheath of plastic material cannot be controlled automatically as a function of the height of the package to be wrapped; the useful length of sheath to be delivered is adjusted manually as a function of the height of the item to be packaged, before each operation. In the case in which the items inserted successively into the vertical framework of the machine are of varying heights, it is thus essential to perform an additional action for adjustment of the length of sheath to be delivered, which action has the shortcomings of being protracted and complex, between two packaging operations.

The displacement for insertion of the products on the pallet into the framework of the machine, as well as the displacement for discharge of the packaged product, is horizontal whereas the movement for enwrapment of the products by the sheath of plastic material is a downward vertical movement; a discontinuity is thus produced in such a method of wrapping over five faces, since the downward displacement of the sheath cannot begin until the moment when the items to be wrapped have been placed in precise alignment with the opening of the said sheath by horizontal displacement.

Finally, a machine for enwrapment on six sides is known, this machine consisting of two chests or cases articulated relative to each other, the product to be packaged being inserted between the two cases whilst it exerts a thrust on the sheet of plastic material employed for packaging. A machine of this kind, for example as described in the German Pat. DAS No. 1,277,736, has the following disadvantages:

The package is limited to parcels of very small size.

After welding the sheet of plastic material on a fourth side of the parcel, the said sheet must equally be welded at the fifth and sixth sides at right angles to the fourth side, to complete the package, which represents an additional action and thus a loss of time for each packaging operation to be performed.

The invention has as its object to eliminate the numerous aforesaid disadvantages and, to this end, it relates to a method and to a machine for the continuous enwrapment (of goods) in a six-sided package. The initial wrapping material consists of a flattened tubular sheath rolled on a cylinder and unreeled continuously, said sheath comprising two wide and parallel adjacent side surfaces and, between these, two lateral V-shaped internal tuck folds intended to form the two narrow opposed lateral sides of the packaging.

According to the invention, the machine allows of continuous packaging without any intermediate operation of any sort, over the six sides of the products or objects it receives for their enwrapment. The machine according to the invention, without any resetting modification, renders it possible to employ a variety of sheath widths and equally allows of the continuous enwarpment of objects or products to be packaged: of different heights, of different widths, but equally and primarily, of different lengths. In particular, the value of this last dimension is unlimited for the item to be packaged, owing to the fact that this latter is fed into the machine in horizontal position, the sole limitation being imposed by the actual size of the machine.

According to the invention moreover, the machine performs an automatic determination, as a function of the dimensions of the parcel to be packaged, of the useful length of sheath to be delivered on the one hand, and on the other hand its own operating characteristics, in particular the useful length along which it is to apply a negative pressure action.

Finally, the movement of insertion and extraction of the parcel into and from the machine, as well as the movement of insertion of the sheath of plastic material, are parallel; in practice, the parcel to be wrapped pushes the parcel wrapped so that there is no loss of time between the different operations. To establish this feature, and contrary to the machines described by the German patent applications and relating to enwrapment on five sides, the sheath of plastic material is no longer induced to cap the parcel to be wrapped, and on the contrary, in the machine according to the present invention, it is the parcel which is inserted within the tubular sheath of plastic material already opened.

According to a first feature, a method for the continuous enwrapment of products or objects in a package, in particular in a six-sided parallelepipedal package, of heat-weldable and heat-shrinkable plastic material, this wrapping material being delivered continuously in the form of a flattened tubular sheath comprising two side and adjacent parallel sides and, between them, two lateral internal V-shaped tuck folds intended to form the two opposed narrow sides of the wrapping, is characterized by the fact that the front edge of the sheath is welded transversally to form the bottom of the package, after which the sheath is fed forward by a slightly longer length than that of the package to be produced, plus the transversal dimension of this package in the direction at right angles to the direction of advance of the sheath in the flat condition, transversal suctions are applied in opposed directions on a principal section of the two wide lateral sides of the sheath, being a section of slightly longer length than that of the package plus half the height of the package, whilst leaving free — in the part preceding this principal section — an extreme section terminating at the transversal weld and having a length slightly longer than half the height of the package, the wrapping is opened by transversally moving apart the principal sections of the two wide sides exposed to the said suctions, along a distance slightly longer than the height of the package to be produced, in such manner as to form a bottom by transversal deployment of the said extreme section at their front extremity on the one hand, and an opening at their other rear extremity on the other hand, after which the products or objects to be wrapped are inserted through the said opening as far as the bottom of the package, after which the two extreme rear sections of the two wide sides of the wrapping are then folded down towards each other in the direction of the axis of the same, said rear sections having a slightly longer length than half the height of the package, whilst applying a rearward thrust in the direction of the axis on the rear extreme sections of the two small opposed sides, and the package is finally closed by making a weld between the adjacent edges of the two extreme rear sections folded against each other.

According to a second feature, a machine for the continuous wrapping of products or objects in a package, in particular in a six-sided parallelepipedal package, of heat-weldable and heat-shrinkable plastic material, the said machine comprising an unreeling device for continuous delivery of the flattened tubular sheath, a suction device for transversal deployment of the sheath to form a parallelepipedal package as well as transversal severing and welding devices situated upflow of the suction deployment device, is characterized in that it comprises two, upper and lower, hollow principal and horizontal suction plates, which are displaceable relative to each other and whereof the opposed surfaces are perforated by openings in communication with a source of vacuum, each of the said plates comprising — at their rear part — an auxiliary suction plate performed at its surface opposed to the other auxiliary plate by openings which are equally in communication with the source of vacuum, each of the two auxiliary plates being situated in the extension of the principal plate to which it is linked and on which it is articulated around a transversal and horizontal axis; means of controlling the pivoting of the one in the direction of the other of the auxiliary plates relative to the principal plates; welding devices carried by the rear edge of each auxiliary suction plate and means allowing of forward entrainment between the two principal horizontal plates of the flattened sheath along a slightly longer length than that of the package plus the transversal dimension (height) of the package. An embodiment of the present invention will now be described by way of example, with reference to the accompanying drawings, in which:

Figure 2:
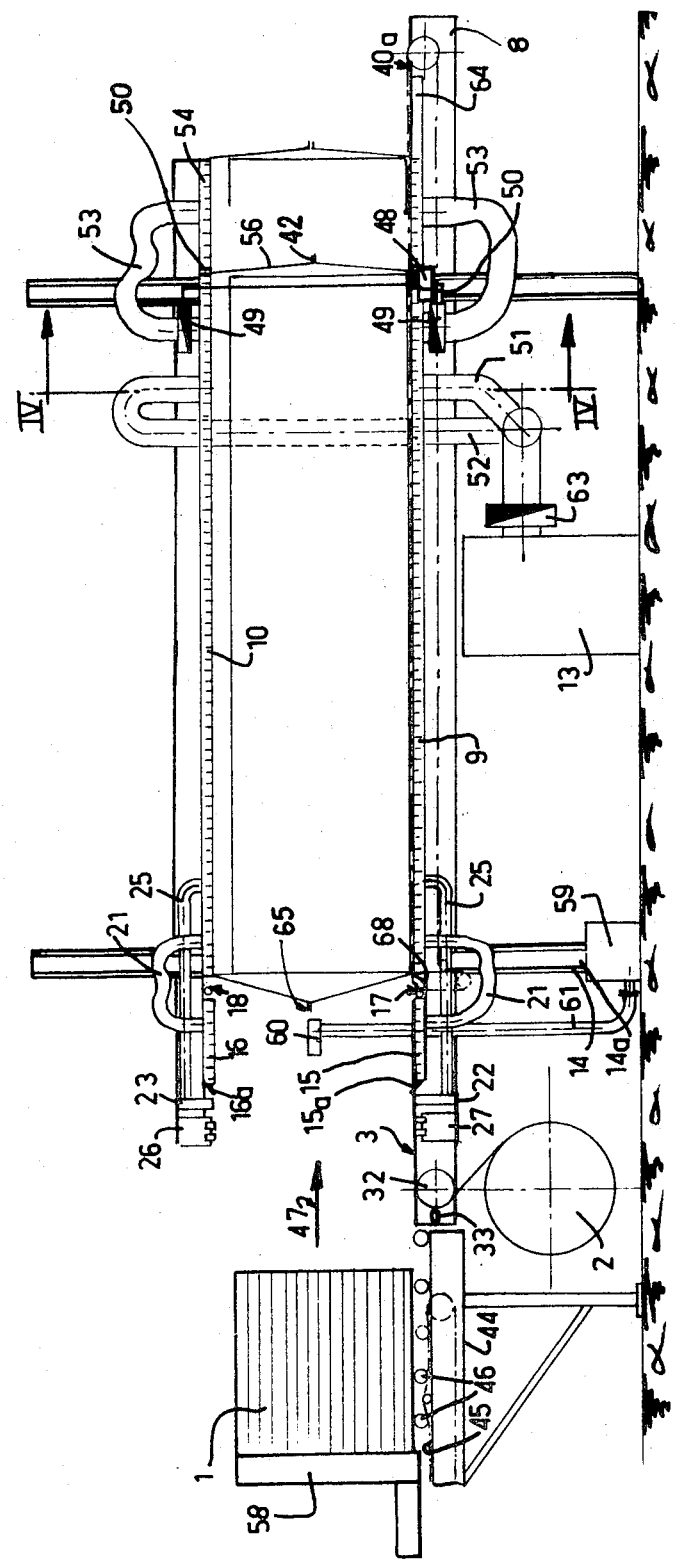
FIG. 2 is a corresponding side elevational view.
Figure 9:
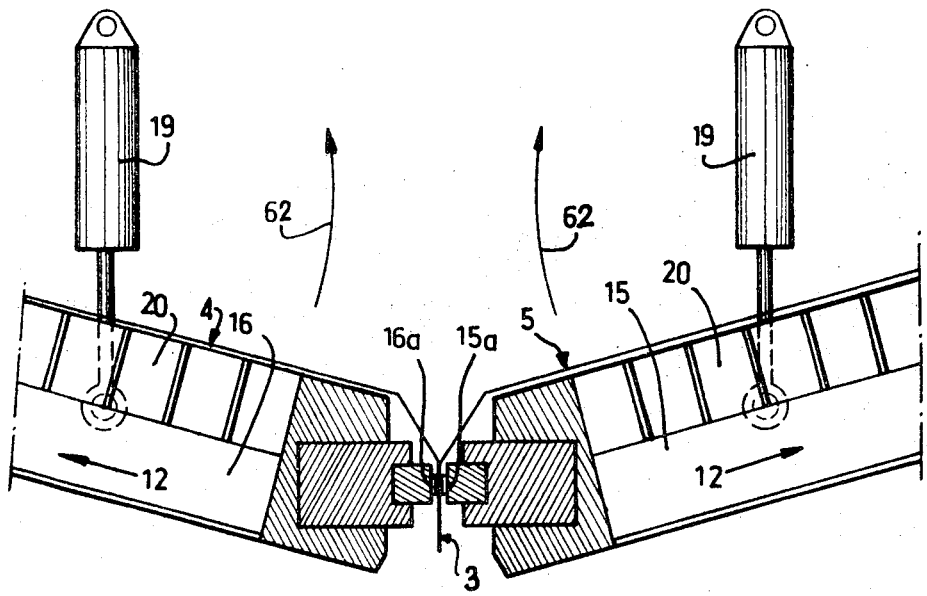
FIG. 9 is a sideview of the two auxiliary plates in the working position.

The item 1 to be packaged appears either in the form of compact parallelepipedal blocks, or in the form of horizontal panels superposed in such manner as to form volumes substantially identical to those of the blocks;

this latter composition of the item to be packaged is that illustrated in FIG. 2 but it will easily and evidently be grasped that the present invention protects the packaging of any load, irrespective of its nature, its volume, its constitutive elements, provided that its shape allows of the application of the method according to the invention.

Figure 3:
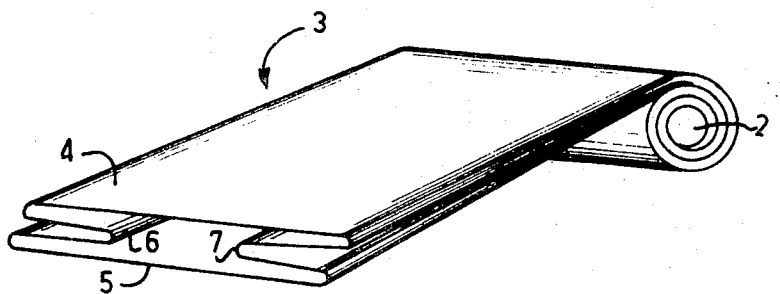
FIG. 3 is a view of the flattened tubular sheath of heat-weldable and heat-shrinkable material arranged on its unreeling cylinder.

The packaging material, of heat-weldable and heat-shrinkable material, for example consists of a "biorientation" transparent film of polyethylene of a thickness of 100 microns, supplied in the form of rolls 2. Referring to FIG. 3, it is observed that the wrapping is delivered in the form of a flattened tubular sheath 3 comprising two wide adjacent and parallel sides 4 and 5 and, between them, two lateral internal V-shaped tuck folds 6 and 7 intended to form the two opposed narrow sides of the wrapping applied. The width of the first sheath, which is a function of the width of the package to be produced, is equal to this last width plus the shrinkage margin of the film, being a margin of 15 to 20 percent, which is sufficient to allow of easy and rapid insertion of the products to be packaged.

Figure 1:
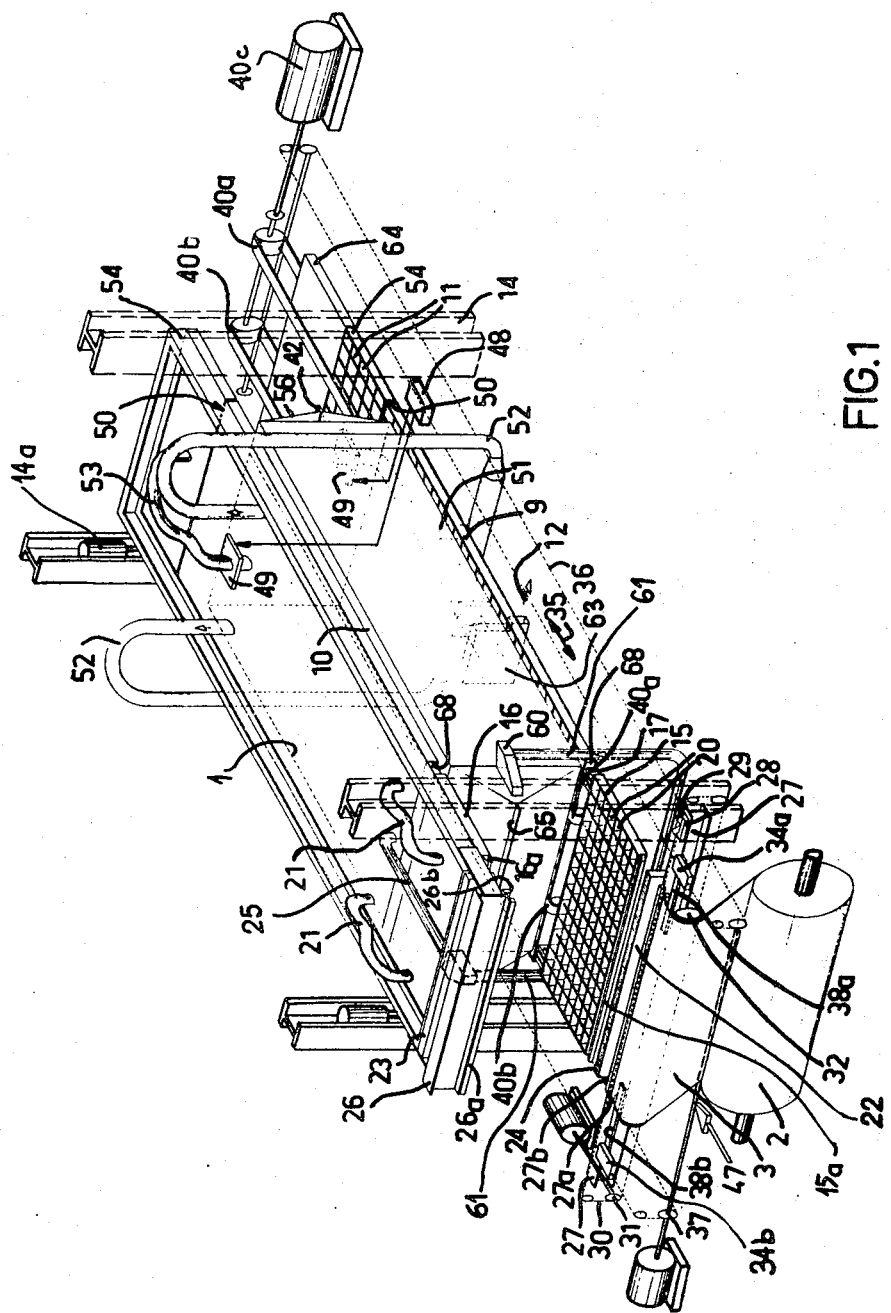
FIG. 1 is a perspective view of the automatic machine for automatic enwrapment according to the invention.

The machine allowing of the application of the method according to the invention, illustrated in FIGS. 1 and 2, comprises the following elements in unit with a frame 8: a first and lower principal plate 9 and a second and upper horizontal plate 10, which are horizontal, displaceable relative to each other, and whereof the opposed surfaces are perforated by openings 11 in communication at 12 with a source of vacuum 13, for example a vacuum pump, allowing of the application of suction on the wide lateral sides of the sheath and controlling the said negative pressure in such manner that the said sheath of plastic material does not burst and is not sucked in. The lower plate 9 is in unit with the frame 8 of the machine and the upper principal plate 10 slides relative to the lower plate 9 between four guiding posts 14 arranged in pairs at the front and rear extremities of the machine. The displacement of the upper plate relative to the lower plate is assured, for example, by means of rams 14a arranged within the guiding posts 14.

At its rear part, each principal plate comprises an auxiliary plate, respectively being a lower plate 15 and an upper plate 16. The auxiliary plates are situated in the extension of the principal plates and are articulated on these latter, respectively around transversal and horizontal axes 17 and 18. Devices such as rams 19 are incorporated moreover to operate the pivoting of the one in the direction of the other of the auxiliary plates 15 and 16 relative to the principal plates 9 and 10. Moreover, the opposed surfaces of the auxiliary plates 15 and 16 are perforated by openings 20 analogous to the openings 11, and equally in communication with a source of vacuum. In the illustration of FIGS. 1 and 2, there is a single source of vacuum 13, and owing to this fact, the openings 20 of the auxiliary plates 15 and 16 are in communication with the openings 11 of the principal plates 9 and 10 through flexible pipes 21. Along their rear transversal edge, the two auxiliary suction plates 15 and 16 comprise devices 15a and 16a allowing the sheath of plastic material 3 to be welded, the lower element 15a for example being the heating device and the upper element 16a being an inert Teflon-coated surface intended solely to act as an abutment for the heating element 15a.

Upflow of the auxiliary plates are situated two transversal chests of cases, being a lower case 22 and an upper case 23, in unit with the corresponding upper 10 and lower 9 principal plates, fixed relative to these latter, perforated by openings 24 which are in communication through rigid pipes 25 with the openings of the principal plates 9 and 10 and thus with the vacuum source 13. The function of these two transversal cases 22 and 23 is to exert a complementary suction on the wide external sides of the sheath 3, to facilitate the insertion of the products to be packaged.

Upflow of these two cases 22 and 23 are situated transversal cutting and welding devices, equally consisting of two lower and upper elements, said elements being in unit with the corresponding lower 9 and upper 10 principal plates. The upper element 26 of this welding device comprises two parallel and transversal projecting parts 26a and 26b, whereas the lower element 27 comprises two parallel and transversal projecting parts 27a and 27b which are both situated in vertical planes passing through the corresponding projections 26a and 26b. One of the two upflow projecting parts, being the lower part 27a for example, is a heating element, whereas the other upflow projection, being the upper projection 26a, comprises an inert Teflon-coated surface. The two downflow projecting parts, being the lower 27b and upper 26b, are inert bearers, for example of brass, solely intended to ensure the stability and support of the sheath 3 during its cutting by a cutting device 28.

Figure 7:
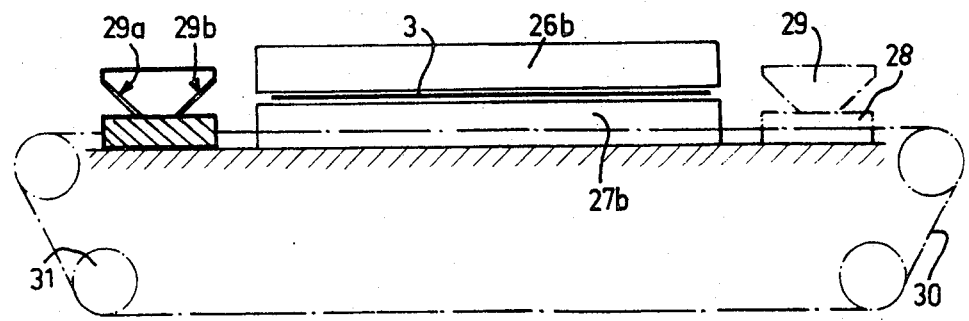
FIG. 7 is a front view of the same devices, showing the means of entrainment of the cutting device as well as the relative position of the welding device.

This cutting device 28 in unit with any one of the two principal plates, being the lower plate 9 in the case illustrated, carries a double-edged 29a and 29b cutter 29, the cutter being situated in the transversal direction relative to the direction of displacement of the sheath 3, in a vertical plane substantially coincident with the median plane between the two projecting parts 27a and 27b. The cutter 29 entrained by an endless chain 30, displaceable along four hubs, the hub 31 being driven for example, is displaced between the inner sides of the projecting parts 27a and 27b between two extreme positions illustrated in FIG. 7, the one by a solid line, the other dash-dotted, slightly outside at the right and left of the welding device 26 and 27, as seen according to the direction of displacement of the sheath 3.

The unreeling cylinder 2 of the sheath 3 is situated upflow of the machine described in the foregoing. By means of a tensioning and positioning cylinder 32, the sheath 3 is placed in a substantially horizontal position in alignment with the transversal cutting and welding devices. A ram 33 for thrust on the sheath 3 ensures the retention of the latter on the cylinder 32 when the tension exerted on the sheath in the direction of the machine becomes equal to nought. The ram 33 equally prevents a rearward displacement of the sheath 3.

According to another feature, the machine according to the invention at each of its longitudinal sides comprises, in alignment with the inner lateral V-shaped tuck folds 6 and 7 of the sheath 3, two symmetrical supports 34a and 34b which are both entrained in identical motion 35 by an endless entraining chain 36 displaceable along four hubs, the hub 37 being driven for example; each of the supports 34a and 34b carries an entraining finger 38a and 38b, each of these fingers, at either side of the sheath 3, being at least partially inserted within one of the two symmetrical inner lateral V-shaped tuck folds 6 or 7.

Figure 4:
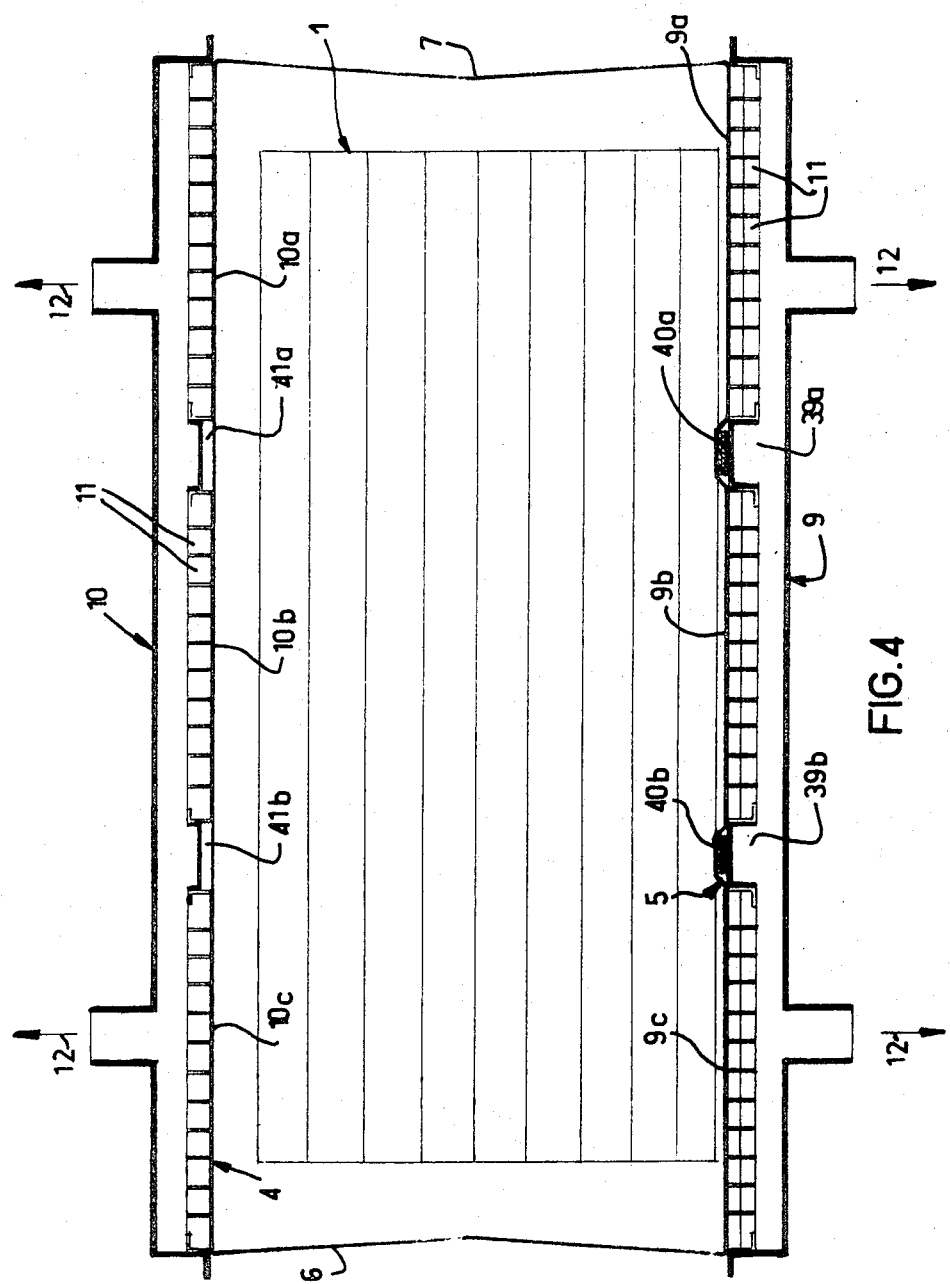
FIG. 4 illustrates a cross-section of the machine according to the invention along the section IV—IV.
Figure 5:
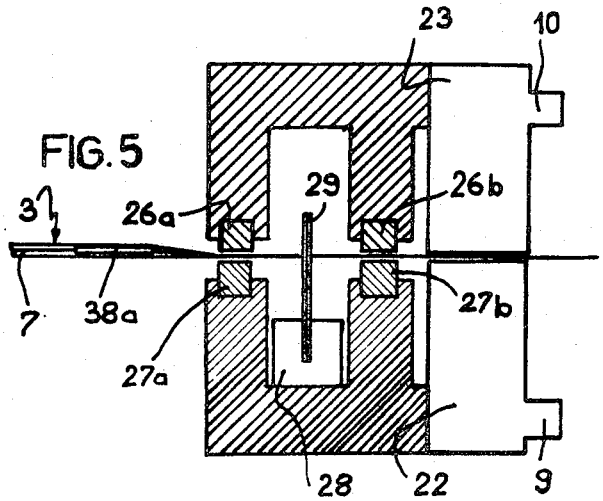
FIG. 5 is a view in detail of the transversal cutting and welding devices for the front edge of the sheath, intended to form the bottom of the package.

According to another feature, the lower principal suction plate 9 is wrought longitudinally in three parts 9a, 9b, 9c, forming two passages 39a and 39b between them. Two conveyor belts 40a and 40b are arranged correspondingly over the passages 39a and 39b and are apt to penetrate into two longitudinal recesses 41a, 41b forming part of the upper principal plate 10 and dividing this plate 10 into three parts 10a, 10b, 10c having the same characteristics as the parts 9a, 9b, and 9c (FIG. 4). These recesses 41a and 41b allow of reception of the belts 40a and 40b when the upper plate 10 is brought into contact with the lower plate 9 by its downward displacement relative to this latter. The conveyor belts 40a and 40b are stationary upon insertion of the parcel to be packaged and are not placed in motion except to allow of extraction of the wrapped parcel and simultaneously to facilitate the insertion of the sheath 3 intended to package the parcel which is offered up next. The element actuating the displacement of these belts 40a and 40b is a motor 40c, for example.

The operation of the apparatus is the following:

At the beginning of an operating cycle, the sheath 3 is welded transversally at 42 along its front edge 55 in such manner as to form the bottom of the package. The entraining fingers 38a and 38b inserted into the two inner tuck folds of the sheath 3 a little behind the weld 42, prevent rearward displacement of the sheath 3. The upper principal plate 10 is in the idle position, that is to say raised, and the auxiliary plates 15 and 16 are equally in the idle position, that is to say situated in the extension of their corresponding principal plate. The conveyor belts 40a and 40b are stopped. The cutter-holder 28 is at any one of its two extreme idle positions shown in FIG. 7 and the supports 34a and 34b of the entraining fingers 38a and 38b are in the initial position, that is to say at their extreme position at the rear side of the machine.

Finally, no negative pressure is transmitted to the various openings of the plates by the vacuum source 13, owing to the closure of the valve 63.

A parcel 1 is carried on to the table 44 situated upflow of the machine, by the conveyor belts 45, and triggers the automatic operating cycle. To this end, the parcel 1 rests on a definite number of electric contacts 46 arranged at intervals which are all determined precisely, the length of the said parcel 1 detected by means of the contacts 46 being transmitted to the control element 37 of the entraining fingers 38a and 38b of the sheath 3. The entraining fingers 38a and 38b bearing on the weld 42, pull the sheath 3 into the machine along the direction 47, along the upper surface of the lower plate and, in step and at the rate of the passage of the supports 34a and 34b in front of the contactors 48, through these contactors cause the opening of electromagnetic valves 49 apt to operate the application of negative pressure to the lower 9 and upper 10 plates over a principal section of slightly longer length than that of the package plus half the height of the package. Thus, considered in the longitudinal direction, the two principal lower 9 and upper 10 plates are divided close to their front extremity into several transversal compartments, the separation between these appearing at 50 for example.

Owing to this fact, if the negative pressure is considered which will be applied later upon descent of the upper plate 10 towards the lower plate 9 by the opening of the main valve 63 from the vacuum source 13, respectively through the pipes 51 and 52 to the lower assembly consisting of the plates 9 and 15 and the case 22 on the one hand, and to the upper assembly consisting of the plates 10 and 16 and of the case 23 on the other hand, the said negative pressure will not be transmitted to the compartments 54 until after the corresponding opening of the valves 49 connected to the preceding vacuum pipes 53.

By the very principle of operation of the machine, the compartments 54 exposed to application of vacuum by opening the valves 53, are actually situated at the front part of the machine, beyond a definite useful length which will represent the minimum length of all the parcels, which length may be defined as being equal to 2 meters, for example.

The principal plates 9 and 10 will advantageously comprise — at their front part — at least two compartments of a length of 50 centimeters each, respectively corresponding to useful vacuum application lengths of 2.50m and 3 m. In this case, four valves 49, being two upper and two lower valves, will actuate the application of vacuum in the front compartments 54 and this over the length corresponding precisely to the length of the package to produce and which is still positioned on the reception table 44.

During the same time in which the principal plates 9 and 10 are prepared for application of vacuum over a length strictly equal to that of the item 1 to be packaged, the sheath 3 entrained by the two fingers 38a and 38b advances before the upper surface of the lower plate 9 by a length representing that of the package to be produced plus a dimension slightly greater than the height of the package, this total length evidently being increased by the margin of 15 to 20 percent needed for shrinkage of the sheath and already quoted in the paragraph relating to the width of this sheath.

The supports 34a and 34b, following their useful stroke and after operation through the contactors 48 of the opening of the valves 49 along appropriate distances, return whilst sliding within the inner folds 6 and 7 to their initial position illustrated in FIG. 1 and actuate the descent of the upper principal plate 10 and of the complementary elements of the same, being: the auxiliary plate 16, the welding device 26 the complementary vacuum chest 23, the upper plate 10 thus coming into contact with the lower plate 9. All the principal and auxiliary plates, as well as the transversal cases, are then exposed to vacuum by the opening of the main valve 63 and the two wide, parallel and adjacent sides 4 and 5 of the sheath 3 are powerfully applied on the opposed faces of these plates and of these cases. The recesses 41a and 41b, as has been described, allow of reception of the belts 40a and 40b upon contact between the upper 10 and lower 9 plates, which allows of perfect grasping of the wide lateral sides of the sheath 3 through the different openings 11 to which vacuum is applied.

At the instant of contact between the lower and upper plates, the welding device formed by the projecting parts 26a and 27a performs the transversal weld 42 which will later form the front edge of the sheath 3 intended to wrap the parcel which is to be offered up on the table 44 following the parcel in readiness at the time. The severing of the sheath 3 is performed, downflow of this last transversal weld 42, by means of one or the other of the cutting edges 29a or 29b of the cutter 29, which cutter — after the severing operation — occupies an extreme position symmetrical to that it had occupied relative to the longitudinal axis of the machine, before cutting.

After the period needed to produce the weld 42 and the cut along the transversal front edge 55, the upper plate 10 and its integral elements are raised by means of the rams 14a arranged in the guiding posts 14, up to a slightly greater height than the height of the item 1 to be packaged. Since the upper plate 10 is exposed to vacuum, it evidently entrains with it the wide upper lateral side 4 of the sheath 3. This sheath is unfolded and automatically assumes the shape shown in FIGS. 1, 2 and 4, that is to say that its narrow lateral sides are substantially vertical, like the extreme section 56 situated at the front part of the principal section exposed to vacuum; the said extreme section 56, terminating at the transversal weld 42 produced upon initiation of the previous cycle, itself has a slightly greater height than the height of the package to be produced, and owing to this fact forms the bottom of the package.

The interruption of the raising of the upper plate 10 actuates the advance of the pushrod 58 and the insertion of the parcel 1 into the sheath 3 through the rear opening comprised in the latter and which has a slightly greater cross-section than that of the parcel to be packaged. The parcel is carried automatically to the closed extremity 56 by means of a pushrod 58 and, to this end, this latter will advantageously be of swan-neck shape; the belts 40a and 40, which are stationary, facilitate the insertion of the parcel by acting as slides. At this moment, the rear vertical side of the parcel is abreast of the rear transversal edge 68 of the plates 9 and 10.

At the end of its stroke, the pushrod 58 actuates its return as well as the starting of an air blower 59 connected to two symmetrical lateral blast ducts 60 at the right and left, each being arranged substantially in the median horizontal plane of the package at the extremity of an air feed duct 61. The function of these blast ducts 60 consists in impelling — in the direction of the axis of the machine — the extreme rear sections of the two opposed narrow lateral sides, and subsequently, upon closure of the package, in producing a perfectly tidy appearance of this latter without any useless surplus of plastic material on the completed package.

After the pushrod 58 has been released from the auxiliary plates 15 and 16, the said pushrod by actuation of the rams 19 operates the closing of the auxiliary plates 15 and 16 by their pivoting in the direction of arrows 62 around their corresponding axes of rotation 17 and 18. In the closed position, the auxiliary plates 15 and 16 place their projecting parts 15a and 16a in contact and actuate the rear end welding 65 of the sheath 3, thus forming the second base of the package. At the same time, the stopping of the blower 59 of the lateral ducts 60 as well as the closing of the main valve 63 situated at the outlet of the vacuum pump 13 are operated; owing to this fact, the pressure prevailing in the openings 11, 20 and 24 becomes equal to atmospheric pressure.

After the time needed for the rear weld 65, the reopening of the auxiliary plates 15 and 16 by means of the rams 19 is actuated on the one hand, and on the other hand the discharge of the parcel packaged by starting the motor 40c for driving the conveyor belts 40a and 40b until the rear part of the parcel packaged is brought abreast of the discharge table 64. From this discharge table, the parcel packed will be picked up by other conveyor belts (not shown) in unit with a conveying unit, which is not shown either since it does not form part of the present invention. This last conveying unit carries the parcel packaged to the ingress of the shrinking stove, in which the sheath 3 by shrinkage in all its directions, will mould itself closely to the parallelepipedal shape of the parcel 1 to be packaged.

Whilst the wrapped parcel is entrained towards the shrinking stove, a second parcel to be packaged which is positioned above the reception table 44 over a definite number of electric contacts 46, operates the insertion of the sheath 3 by displacement of the entraining fingers 38a and 38b in unit with the supports 34a and 34b, along the direction 47, along a length which is a function of the length of this next parcel, the displacement of the supports 34a and 34b in its turn operating the opening of the complementary valves 49 in such manner that vacuum is applied only over the useful length of the principal plates correspondingly precisely to the length of the package to be produced, plus substantially half the height of this package.

Two positions of the extreme front section 56 of the sheath 3 as well as two positions of the corresponding parcel have been illustrated by way of example in FIG. 2, at the front part of the machine, these different positions illustrating the method of application of the compartments 54 rendering it possible to obtain the required length of vacuum application.

Figure 6:
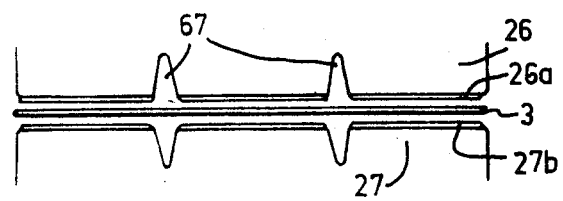
FIG. 6 is a partial front view of the devices of FIG. 5.
Figure 8:
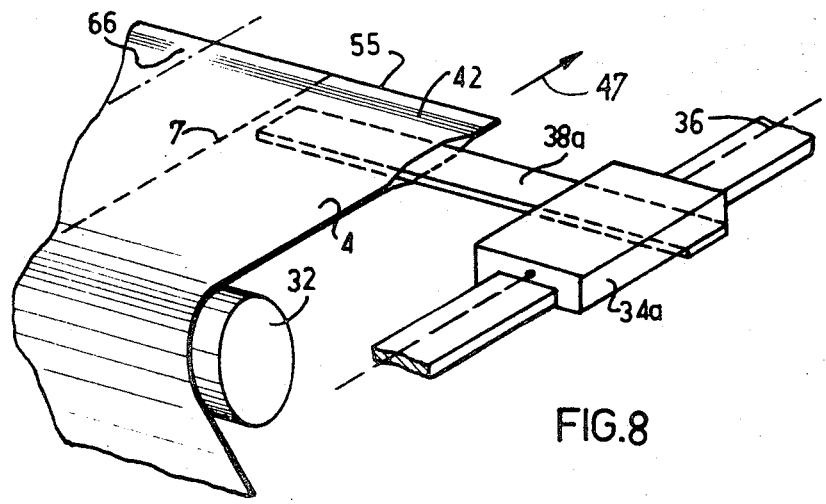
FIG. 8 is a detailed view in perspective of the means allowing of forward entrainment of the flattened sheath.

Advantageously, to allow the air present between the item to be packaged and the sheath 3 to escape during the shrinkage of the sheath, vents 66 are wrought during the welding at 42 of the sheath 3. To this end, at least one notch 67 which interrupts the continuity of the projecting parts 26a and 26b producing the front weld 42, is wrought as illustrated in FIG. 6. For example, a central vent could be incorporated as illustrated in FIG. 8, or two symmetrical vents as illustrated in FIG. 6.

The advantages of the machine which has been described reside essentially in the fact that:

It produces a completely sealed package since it is wrapped on six sides.

All the operations are controlled automatically without any manual intermediate action; in particular, the length of the parcel to be packaged determines the useful length of the sheath to be delivered, as well as the useful length over which the lower and upper principal plates should exert their vacuum action.

The succession of packages is performed in practically continuous manner; in point of fact, the release of the first parcel packaged simultaneously causes the insertion into the machine of the sheath intended to package the second parcel.

The dimensions of the parcel to be packaged are limited only by the actual dimensions of the machine, since a perfect stability of the said parcel is assured by the fact that the parcel is fed horizontally into the machine, after which it is still handled horizontally.

To the intrinsic advantages of the machine according to the invention must evidently be added the advantages of packaging under a heat-shrinkable plastic film, being: protection against atmospheric agents, cohesion of the load, visibility of the products forming the load.

The invention is evidently not limited to the forms of application nor to the forms of embodiment which have been specified; a variety of modified forms may be envisaged without thereby exceeding the scope of the invention.

What I claim is:

1. Method for the continuous enwrapment of products or objects in a package, in particular in a six-sided parallelepipedal package, in a heat-weldable and heat-shrinkable plastic material, the steps of continuously feeding the wrapping material in the form of a flattened tubular sheath having two side and adjacent parallel sides and between said sides two inner lateral V-shaped tuck folds which will form the two opposed minor sides of the package, transversely welding the front edge portion of the sheath to form the base of the package, advancing the sheath forward in a flat condition a distance slightly longer in length than that of the package to be produced plus the transverse dimension of the package in a direction at right angles to the direction of movement of the sheath, applying suction forces transversely and from opposite sides over a principal section of the two major lateral sides of said sheath, said section being slightly longer than the length of the package plus half the height of the package, while at the same time leaving free in the part preceding said principal section an extreme section terminating at the transverse weld and having a length slightly longer than half the height of the package, cutting the flattened sheath to the desired length and then opening the tubular wrapping by transversely moving apart the principal sections exposed to the suction forces, thus separating the two wide sides of the sheath along a distance slightly greater than the height of the package to be produced, so as to form a closed end or base by the transverse deployment of said extreme section at the front extremity on the one hand, and with an opening at the rear extremity on the other hand, then while holding the opened sheath in this position, moving the products or objects to be wrapped through said opening into the opened sheath as far as the closed end or base of the package, then closing the open end of the package by folding over the two extreme rear sections of the two major sides of the sheath in an inward direction, said rear sections having a slightly longer length than half the height of the package, and impelling inwardly the two minor lateral sides of the sheath and finally sealing the package by welding the adjacent edges of the two extreme rear sections in folded condition to each other.

2. The method defined in claim 1 wherein the front edge of said sheath when transversely welded has one or more vent openings formed therein to allow for the evacuation of air that might be trapped within the package.

3. The method defined in claim 1 wherein the extreme rear sections of the two minor and opposed lateral sides are impelled by external fluid blasts applied at either side of said sections in an inward direction and substantially in a median horizontal plane of said products being packaged.

4. Machine for the continuous enwrapment of products or objects in a package, in particular in a six-sided parallelepipedal package, of heat-weldable and heat-shrinkable plastic material, the said machine comprising an unreeling device for continuous delivery of a flattened tubular sheath, a suction device for transversal unfolding of the sheath to form a parallelepipedal package as well as transversal cutting and welding device situated upstream of the suction unfolding device, characterized by the fact that it comprises two hollow horizontal suction plates, being an upper and a lower plate, which are displaceable relative to each other and whereof the opposed surfaces are perforated by openings in communication with a vacuum source, the said plates at their rear part each comprising an auxiliary suction plate perforated in its surface facing towards the other auxiliary plate by openings equally in communication with the vacuum source, each of the two auxiliary plates being situated in the extension of the principal plate to which it is linked and on which it is articulated around a transversal and horizontal axis; means of operating the pivoting of the one in the direction of the other of the auxiliary plates relative to the principal plates; welding devices carried by the rear edge of each auxiliary suction plate and devices allowing of forward entrainment between the two principal horizontal plates, of the flattened sheath along a slightly longer length than that of the package plus the height of the package.

5. A machine as defined in claim 4, wherein said flattened tubular sheath is provided with inner lateral V-shaped tuck folds and said devices allowing of forward entrainment of the sheath between the two principal horizontal plates consist of two symmetrical lateral entrainment fingers of which each is engaged in one of the two inner lateral V-shaped tuck folds of the flattened tubular sheath behind the weld made transversally along the front edge of the said sheath to form the bottom of the package, each lateral entraining finger being secured to a support linked to an endless entraining chain driven by a motor.

6. Machine according to claim 4, characterized by the fact that the lower principal suction plate is formed longitudinally in at least three parts leaving at least two passages between them, a conveyor belt being situated above each corresponding passage, and by the fact that the upper principal suction plate is formed longitudinally in at least three parts forming between them at least two longitudinal recesses situated abreast of the conveyor belts in unit with the lower principal plate, each of the said recesses being apt to receive one of the conveyor belts.

7. Machine according to claim 4, characterized by the fact that it comprises two lateral air blast ducts connected through pipes to a blower, the ducts being situated in alignment with the extreme rear sections of the two opposed minor sides of the unfolded tubular sheath, substantially in the median horizontal plane of the said tubular sheath.

8. Machine according to claim 4, characterized by the fact that the front extremity of each lower and upper principal plate comprises at least one compartment connected to the vacuum source, being exposed to vacuum selectively by the opening of a valve controlled by a contactor in the normal open position, the said contactor being closed and actuating the opening of the valve by the passage before the said contactors of the means of forward entrainment of the flattened sheath.

* * * * *